United States Patent
Hsu et al.

(10) Patent No.: US 11,884,284 B2
(45) Date of Patent: Jan. 30, 2024

(54) BRAKING CONTROL ARCHITECTURES FOR AUTONOMOUS VEHICLES

(71) Applicant: TUSIMPLE, INC., San Diego, CA (US)

(72) Inventors: Yu-Ju Hsu, Tucson, AZ (US); Xiaoling Han, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 653 days.

(21) Appl. No.: 17/080,330

(22) Filed: Oct. 26, 2020

(65) Prior Publication Data

US 2022/0126845 A1    Apr. 28, 2022

(51) Int. Cl.
| | |
|---|---|
| *B60W 50/023* | (2012.01) |
| *B60W 50/02* | (2012.01) |
| *B60W 10/18* | (2012.01) |
| *B60L 7/26* | (2006.01) |

(52) U.S. Cl.
CPC .............. *B60W 50/023* (2013.01); *B60L 7/26* (2013.01); *B60W 10/18* (2013.01); *B60W 50/0205* (2013.01); *B60L 2240/12* (2013.01); *B60T 2270/602* (2013.01); *B60W 2050/021* (2013.01); *B60W 2420/42* (2013.01); *B60W 2420/52* (2013.01)

(58) Field of Classification Search
None
See application file for complete search history.

(56) References Cited

U.S. PATENT DOCUMENTS

| | | | |
|---|---|---|---|
| 2018/0370540 A1 | 12/2018 | Yousuf et al. | |
| 2020/0327811 A1* | 10/2020 | Smith | ............... H04W 4/02 |

FOREIGN PATENT DOCUMENTS

| | | | | |
|---|---|---|---|---|
| EP | 3448730 B1 * | 7/2020 | ............. | B60T 11/103 |
| WO | WO-2020158585 A1 * | 8/2020 | ............. | B60T 13/662 |

OTHER PUBLICATIONS

"Surface Vehicle Recommended Practice: Taxonomy and Definitions for Terms Related to Driving Automation Systems for On-Road Motor Vehicles," SAE International, J3016, Jun. 2018.

* cited by examiner

*Primary Examiner* — Melanie Torres Williams
(74) *Attorney, Agent, or Firm* — Perkins Coie LLP; Paul Liu

(57) ABSTRACT

Devices, systems, and methods for redundant braking systems and architectures are described. An example method for controlling a vehicle includes receiving, by a braking system, a first set of commands generated by a primary brake controller and a primary vehicle control unit (VCU) comprising multiple processors, receiving a second set of commands generated by the primary VCU and a secondary brake controller, receiving a third set of commands generated by a secondary VCU and the primary brake controller, receiving a fourth set of commands generated by the secondary VCU and the secondary brake controller, and selecting, based on an arbitration logic, exactly one of the first, second, third, and fourth sets of commands to operate the braking system, wherein the primary VCU and the secondary VCU are configured in a master/slave architecture.

20 Claims, 4 Drawing Sheets

BRAKING CONTROL ARCHITECTURES FOR AUTONOMOUS VEHICLES

TECHNICAL FIELD

This document generally relates to controlling vehicles, and in particular, braking systems for autonomous vehicles.

BACKGROUND

Autonomous vehicle navigation is a technology for sensing the position and movement of a vehicle and, based on the sensing, autonomously control the vehicle to navigate towards a destination. Autonomous vehicle navigation can have important applications in transportation of people, goods and services. Redundant braking systems and architectures that enable accurate and safe control of an autonomous vehicle are paramount for the safety of the vehicle and its passengers, as well as people and property in the vicinity of the vehicle.

SUMMARY

Disclosed are devices, systems and methods for redundant braking systems and architectures. In an example, this is achieved by implementing redundant components (e.g., vehicle control units, base controllers, etc.) and configuring multiple paths that provide multiple copies of braking commands to a braking system to ensure that the accurate and safe control of the autonomous vehicle.

In an aspect, the disclosed technology can be used to provide a method for controlling vehicle braking. This method includes receiving, by a braking system, a first set of commands generated by a primary brake controller and a primary vehicle control unit (VCU) comprising multiple processors, receiving a second set of commands generated by the primary VCU and a secondary brake controller, receiving a third set of commands generated by a secondary VCU and the primary brake controller, receiving a fourth set of commands generated by the secondary VCU and the secondary brake controller, and selecting, based on an arbitration logic, exactly one of the first, second, third, and fourth sets of commands to operate the braking system, wherein the primary VCU and the secondary VCU are configured in a master/slave architecture.

In another aspect, the disclosed technology can be used to provide a system for controlling vehicle braking in a vehicle. The system includes a braking system comprising a first input port configured to receive a first set of commands generated by a primary brake controller and a primary vehicle control unit (VCU) comprising multiple processors, a second input port configured to receive a second set of commands generated by the primary VCU and a secondary brake controller, a third input port configured to receive a third set of commands generated by the primary brake controller and a secondary VCU comprising multiple processors, and a fourth input port configured to receive a fourth set of commands generated by the secondary VCU and the secondary brake controller, and a processor configured to select, based on an arbitration logic, an operational set of commands as one of the first set of commands, the second set of commands, the third set of commands, and the fourth set of commands, and operate the braking system based on the operational set of commands.

In yet another aspect, the above-described method is embodied in the form of processor-executable code and stored in a computer-readable program medium.

In yet another aspect, a device that is configured or operable to perform the above-described method is disclosed. The device may include a processor that is programmed to implement this method.

The above and other aspects and features of the disclosed technology are described in greater detail in the drawings, the description and the claims.

DETAILED DESCRIPTION

The transportation industry has been undergoing considerable changes in the way technology is used to control the operation of the vehicles. As exemplified in the automotive passenger vehicle, there has been a general advancement towards shifting more of the operational and navigational decision making away from the human driving and into on-board computing power. This is exemplified in the extreme by the numerous under-development autonomous vehicles. Current implementations are in intermediate stages, such as the partially-autonomous operation in some vehicles (e.g., autonomous acceleration and navigation, but with the requirement of a present and attentive driver), the safety-protecting operation of some vehicles (e.g., maintaining a safe following distance and automatic braking), the safety-protecting warnings of some vehicles (e.g., blind-spot indicators in side-view mirrors and proximity sensors), as well as ease-of-use operations (e.g., autonomous parallel parking).

Braking control is both essential and critical in achieving safety and reliability in autonomous vehicles regardless of their level of autonomy, but especially for Level 4 (L4) autonomous systems as defined in SAE J3016, in which the automation is configured to operate without human intervention under specific conditions, when all of the conditions are met, but wherein a human still has an option to override the autonomous driving system. For L4 systems, the braking control architecture must exhibit a level of robustness that enables it to handle any kind of failure to ensure the safety of the autonomous vehicle and both persons and property in the area surrounding the vehicle.

The traditional human-driven Class 8 vehicle (e.g., a vehicle with a gross vehicle weight rating (GVWR) that exceeds 33,000 lbs.) has an engine brake and a foot brake for drivers to apply a brake force to slow down the vehicle. Current implementations may also include an anti-lock brake system, which is a passive safety mechanism to prevent vehicle instability. However, these existing techniques are not sufficient for fully autonomous vehicles (e.g., as described in FIG. 1) that need more precise braking solutions.

Figure 1:
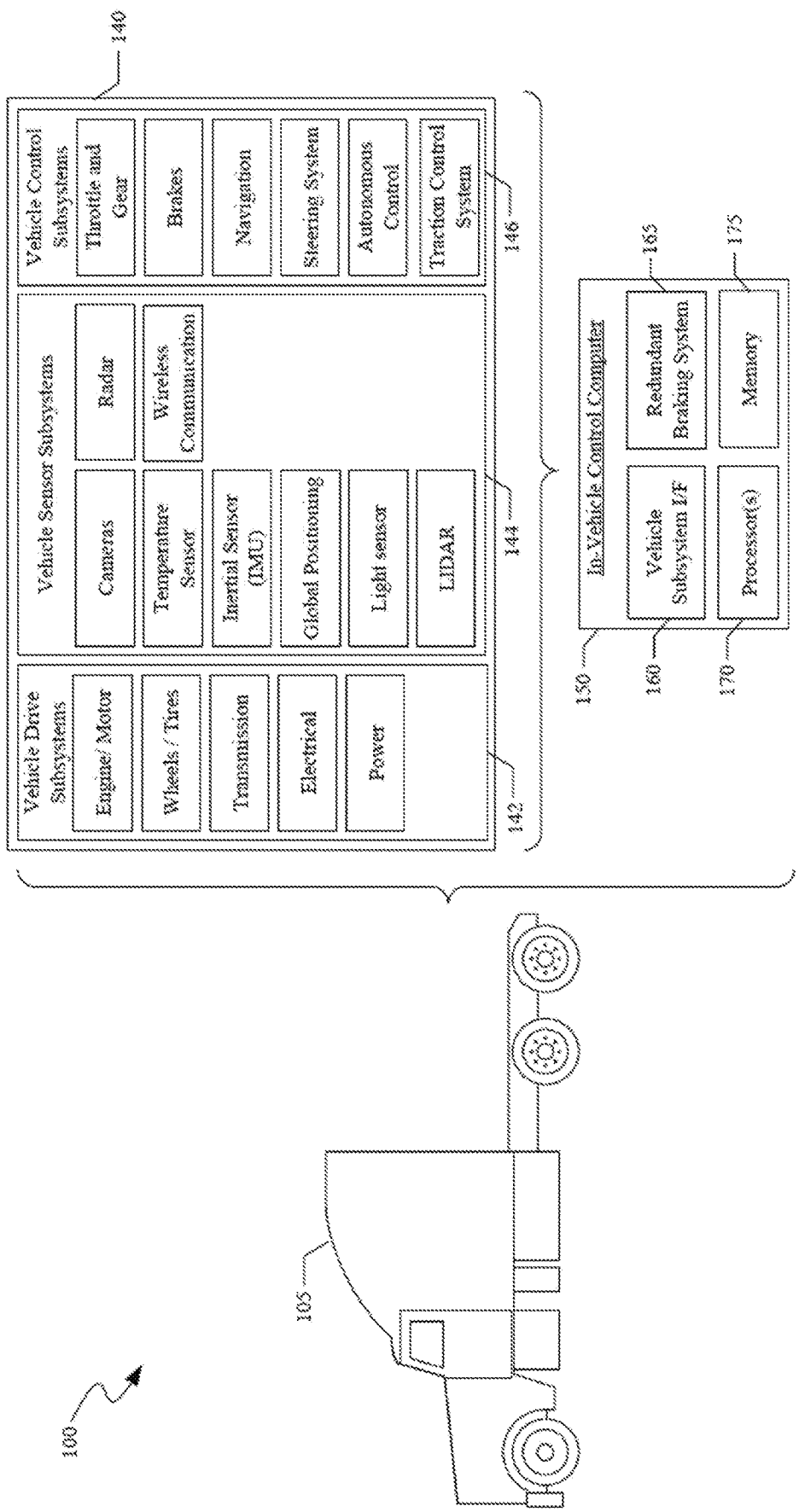
FIG. 1 shows a block diagram of an example vehicle ecosystem in which an in-vehicle control computer located in the vehicle comprises a redundant braking system.

FIG. 1 shows a block diagram of an example vehicle ecosystem 100 in which an in-vehicle control computer 150 located in the autonomous vehicle 105 includes a synchronization unit that synchronizes multiple heterogeneous sensors. As shown in FIG. 1, the autonomous vehicle 105 may be a semi-trailer truck. The vehicle ecosystem 100 includes several systems and components that can generate and/or deliver one or more sources of information/data and related services to the in-vehicle control computer 150 that may be located in an autonomous vehicle 105. The in-vehicle control computer 150 can be in data communication with a plurality of vehicle subsystems 140, all of which can be resident in the autonomous vehicle 105. The in-vehicle computer 150 and the plurality of vehicle subsystems 140 can be referred to as autonomous driving system (ADS). A vehicle subsystem interface 160 is provided to facilitate data communication between the in-vehicle control computer 150 and the plurality of vehicle subsystems 140. In some embodiments, the vehicle subsystem interface 160 can include a controller area network controller to communicate with devices in the vehicle subsystems 140.

The autonomous vehicle 105 may include various vehicle subsystems that support of the operation of autonomous vehicle 105. The vehicle subsystems may include a vehicle drive subsystem 142, a vehicle sensor subsystem 144, and/or a vehicle control subsystem 146. The components or devices of the vehicle drive subsystem 142, the vehicle sensor subsystem 144, and the vehicle control subsystem 146 as shown as examples. In some embodiment, additional components or devices can be added to the various subsystems or one or more components or devices can be removed. The vehicle drive subsystem 142 may include components operable to provide powered motion for the autonomous vehicle 105. In an example embodiment, the vehicle drive subsystem 142 may include an engine or motor, wheels/tires, a transmission, an electrical subsystem, and a power source.

The vehicle sensor subsystem 144 may include a number of sensors configured to sense information about an environment in which the autonomous vehicle 105 is operating or a condition of the autonomous vehicle 105. The vehicle sensor subsystem 144 may include one or more cameras or image capture devices, one or more temperature sensors, an inertial measurement unit (IMU), a Global Positioning System (GPS) device, a laser range finder/LiDAR unit, a RADAR unit, and/or a wireless communication unit (e.g., a cellular communication transceiver). The vehicle sensor subsystem 144 may also include sensors configured to monitor internal systems of the autonomous vehicle 105 (e.g., an 02 monitor, a fuel gauge, an engine oil temperature, etc.). In some embodiments, the vehicle sensor subsystem 144 may include sensors in addition to the sensors shown in FIG. 1.

The IMU may include any combination of sensors (e.g., accelerometers and gyroscopes) configured to sense position and orientation changes of the autonomous vehicle 105 based on inertial acceleration. The GPS device may be any sensor configured to estimate a geographic location of the autonomous vehicle 105. For this purpose, the GPS device may include a receiver/transmitter operable to provide information regarding the position of the autonomous vehicle 105 with respect to the Earth. The RADAR unit may represent a system that utilizes radio signals to sense objects within the environment in which the autonomous vehicle 105 is operating. In some embodiments, in addition to sensing the objects, the RADAR unit may additionally be configured to sense the speed and the heading of the objects proximate to the autonomous vehicle 105. The laser range finder or LiDAR unit may be any sensor configured to sense objects in the environment in which the autonomous vehicle 105 is located using lasers. The LiDAR unit may be a spinning LiDAR unit or a solid-state LiDAR unit. The cameras may include one or more cameras configured to capture a plurality of images of the environment of the autonomous vehicle 105. The cameras may be still image cameras or motion video cameras.

The vehicle control subsystem 146 may be configured to control operation of the autonomous vehicle 105 and its components. Accordingly, the vehicle control subsystem 146 may include various elements such as a throttle and gear, a brake unit, a navigation unit, a steering system and/or an autonomous control unit. The throttle may be configured to control, for instance, the operating speed of the engine and, in turn, control the speed of the autonomous vehicle 105. The gear may be configured to control the gear selection of the transmission. The brake unit can include any combination of mechanisms configured to decelerate the autonomous vehicle 105. The brake unit can use friction to slow the wheels in a standard manner. The brake unit may include an anti-lock brake system (ABS) that can prevent the brakes from locking up when the brakes are applied. Additionally, the brake unit may include an engine braking system. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GPS device and one or more predetermined maps so as to determine the driving path for the autonomous vehicle 105. The steering system may represent any combination of mechanisms that may be operable to adjust the heading of autonomous vehicle 105 in an autonomous mode or in a driver-controlled mode.

The autonomous control unit may represent a control system configured to identify, evaluate, and avoid or otherwise negotiate potential obstacles in the environment of the autonomous vehicle 105. In general, the autonomous control unit may be configured to control the autonomous vehicle 105 for operation without a driver or to provide driver assistance in controlling the autonomous vehicle 105. In some embodiments, the autonomous control unit may be configured to incorporate data from the GPS device, the RADAR, the LiDAR, the cameras, and/or other vehicle subsystems to determine the driving path or trajectory for the autonomous vehicle 105.

The traction control system (TCS) may represent a control system configured to prevent the autonomous vehicle 105 from swerving or losing control while on the road. For example, TCS may obtain signals from the IMU and the engine torque value to determine whether it should intervene and send instruction to one or more brakes on the autonomous vehicle 105 to mitigate the autonomous vehicle 105 swerving. TCS is an active vehicle safety feature designed to help vehicles make effective use of traction available on the road, for example, when accelerating on low-friction road surfaces. When a vehicle without TCS attempts to accelerate on a slippery surface like ice, snow, or loose gravel, the wheels can slip and can cause a dangerous driving situation. TCS may also be referred to as electronic stability control (ESC) system.

Many or all of the functions of the autonomous vehicle 105 can be controlled by the in-vehicle control computer 150. The in-vehicle control computer 150 may include at least one processor 170 (which can include at least one microprocessor) that executes processing instructions stored in a non-transitory computer readable medium, such as the memory 175. The in-vehicle control computer 150 may also represent a plurality of computing devices that may serve to control individual components or subsystems of the autonomous vehicle 105 in a distributed fashion. In some embodiments, the memory 175 may contain processing instructions (e.g., program logic) executable by the processor 170 to perform various methods and/or functions of the autonomous vehicle 105, including those described for the redundant braking system 165 as explained in this patent document. For instance, the processor 170 executes the operations associated with redundant braking system 165, which can be configured to leverage the brakes in the control subsystem 146. The operations of the redundant braking system 165 are further described in this patent document.

The memory 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer 150 may control the function of the autonomous vehicle 105 based on inputs received from various vehicle subsystems (e.g., the vehicle drive subsystem 142, the vehicle sensor subsystem 144, and the vehicle control subsystem 146).

Embodiments of the disclosed technology are configured to achieve Level 4 autonomy. In an example, a brake pressure controller, which mimics the driver foot brake, can be added to work in conjunction with the original ABS controller and engine brake to achieve the same baseline performance as a human driver. However, as an AI-driven vehicle, an additional safety mechanism is designed for integration into the braking control architecture and system. The disclosed architecture provides several different control loops to send commands from the Autonomous Driving System (ADS) to the braking system to achieve fail-operational architecture.

Figure 2:
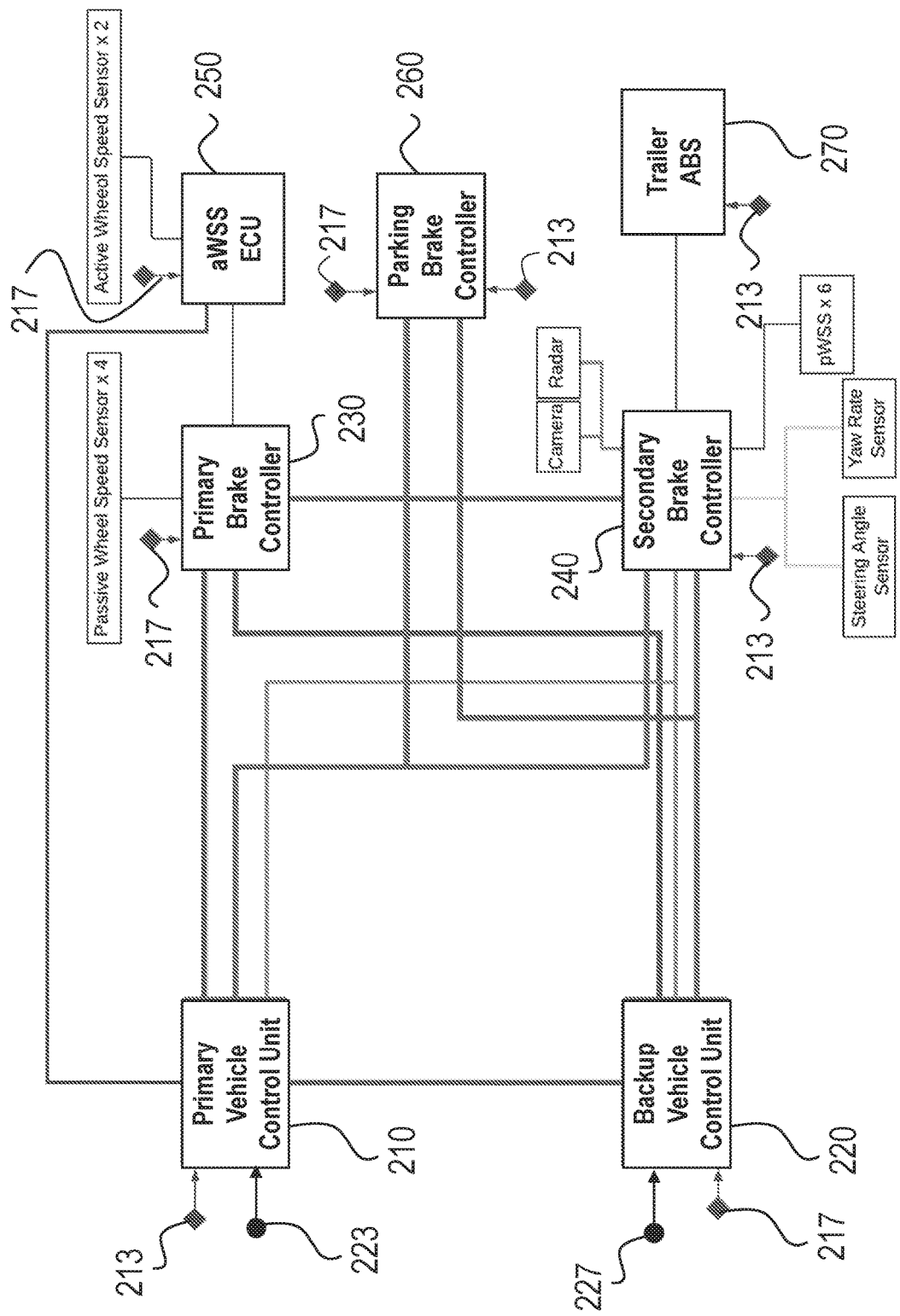
FIG. 2 shows a block diagram of an example redundant braking system.

FIG. 2 shows a block diagram of an example redundant braking system that includes two vehicle control units (VCUs) and two braking controls, which provide redundancy and enable fail-safe operation of the vehicle (e.g., the vehicle shown in FIG. 1). As shown in FIG. 2, the primary VCU 210, the secondary (or backup) VCU 220, the primary brake controller 230, and the secondary brake controller 240 are coupled to each other. This coupling ensures an active redundant architecture wherein the secondary VCU 220 and secondary brake controller 240 are always online to enable a rapid transition in case of an CAN communication error or failure in the primary VCU or the primary brake controller. Furthermore, the primary and secondary VCUs and brake controllers are configured with independent power supplies (denoted 213 and 217 in FIG. 2, respectively) and ignition signal sources (denoted 223 and 227 in FIG. 2, respectively).

The primary and secondary VCUs and brake controllers can generate four commands (or four sets of commands) that are transmitted to throughout the braking system to appropriately operate the brakes for safe operation of the autonomous vehicle. In the braking system, the active VCU (e.g., the primary, master, or operational controller) selects one of the commands (or one set of commands) based on arbitration logic. The four redundant options are generated by (a) the primary VCU 210 and the primary brake controller 230, (b) the primary VCU 210 and the secondary brake controller 240, (c) the secondary VCU 220 and the primary brake controller 230, and (d) the secondary VCU 220 and the secondary brake controller 240. The generation of each of the four sets of commands is at least partially independent with respect to the other three because each of the options use a different set of components.

In some embodiments, when the system is operating as intended, the four options received by the braking system are substantially identical, and the command(s) generated by the primary VCU 210 and the primary brake controller 230 is(are) selected. In the event of failure, one of the other command(s) may be selected based on the arbitration logic. In other embodiments, the one or more of the four options received by the braking system may be different because the secondary brake controller has incorporated sensor output information from, for example, the steering angle and yaw rate sensors. In an example, the arbitration logic can rely on other diagnostic information (e.g., current speed and road traction conditions) to determine whether the additional sensor out information is needed to operate the braking system.

In some embodiments, and in contrast to existing systems and implementations, the primary VCU and/or the secondary VCU can include multiple processors, which advantageously enable, for example, real-time decisions that incorporate additional diagnostic information to be made while the arbitration logic to select one of the set of commands is being processed.

In some embodiments, the braking system architecture shown in FIG. 2 meets the highest Automotive Safety Integrity Level (ASIL), i.e., ASIL D. At this level, the disclosed redundant framework can safely operate in high exposure operational situations (e.g., more than 10% typical operational time) where a malfunction can lead to high severity harm (e.g., death or major bodily harm) with very low controllability (e.g., less than 90% of average drivers or other traffic participants are able to avoid harm).

Continuing with the example in FIG. 2, the primary brake controller 230 is coupled to passive wheel speed sensors from two or more wheels (e.g., four wheels), as well as an active wheel speed sensor (aWSS) electronic control unit (ECU) 250 which acts as a gateway for information from active wheel speed sensors from two or more wheels. The primary VCU 210 is also coupled to the aWSS ECU 250.

A wheel speed sensor (WSS) detects the rotation speed of a wheel that is moving. A passive WSS (pWSS) is configured to create its own AC signal that changes frequency with the wheel speed, and is typically unable to read at or below 2 mph coming from a dead stop, whereas an aWSS can detect rotation speed even as the speed of the vehicle approaches 0 mph and can also detect the direction of rotation. The primary brake controller 230 being coupled to multiple pWSS and aWSS advantageously enables the braking architecture to safely and reliably control the speed of the vehicle.

The primary VCU 210 and the secondary (or backup) VCU 220 are both coupled to a parking brake controller 260. The parking brake is typically used to keep the vehicle motionless when parked, but can also be used to perform an emergency stop should the main hydraulic brakes fail. The primary and secondary VCUs being coupled to the parking brake controller enables the redundant architecture to leverage the parking brake functionality to reliably control the vehicle.

As shown in FIG. 2, the secondary brake controller is coupled to multiple sensors and, in the case the vehicle is a tractor-trailer, to the trailer ABS 270. In this example, the multiple sensors include a camera, a RADAR unit, a steering angle sensor (which measures the steering wheel position angle and rate of turn), a yaw rate sensor (which measures the vehicle's angular velocity around its vertical axis), and pWSS on multiple wheels (e.g., six wheels). Being coupled to the multiple sensors and the trailer ABS 270 enables the redundant architecture to safely and reliably control the speed of the vehicle.

In some embodiments, the components shown in FIG. 2 are coupled using controller area network (CAN) communications and/or protocols, which may be the same or different between different sets of components. For an example, the primary VCU 210, the secondary VCU 220, the primary brake controller 230, and the secondary brake controller 240 can be coupled using a standard J1939 CAN connection and/or a proprietary CAN. For another example, the primary and secondary VCUs can be coupled using a proprietary CAN (e.g., a VCU internal CAN). The parking brake controller and the secondary VCU 240 can also be coupled using a J1939 CAN bus. For yet another example, the primary and secondary VCUs can be coupled to the secondary brake controller 240 (as well as the camera and RADAR unit) using a fusion CAN (e.g., a Bendix CAN). For yet another example, the primary VCU 210 can be coupled to the aWSS ECU 250 using an aWSS CAN. For yet another example, the secondary brake controller 240 can be coupled to the steering angle and yaw rate sensors using a sensor CAN. The components shown in FIG. 2 are coupled using different CAN buses to reflect the difference in typical baud rates exchanged over that particular CAN bus, and to ensure that the data loads do not overload the corresponding CAN bus and it remains healthy.

In some embodiments, as shown in FIG. 2, a first power supply 213 can be configured to power the primary VCU 210, the secondary brake controller 240, the parking brake controller 260, and the trailer ABS 270, and a second power supply 217 can be configured to power the secondary (or backup) VCU 220, the primary brake controller 230, the aWSS ECU 250, and the parking brake controller 260.

In some embodiments, the primary VCU is the main arbitrator of the entire braking system for L4 operation, and is configured to rapidly respond to random hardware failures. For example, the failure may be a VCU failure, a CAN communication failure, or a braking controller failure. Each of these failure modalities is addresses by the system architecture and/or functionality of the described embodiments.

In some embodiments, the primary and secondary VCUs are configured in a master-slave architecture, which is a model of asymmetric communication or control where one device or process (the "master") controls one or more other devices or processes (the "slaves") and serves as the communication hub. Each time the VCUs are turned on, the VCUs check the master-slave hardware configuration and operate accordingly. In the event that the primary VCU fails, the secondary (or backup) VCU, which has been fully operational since start-up, can take over all coordination responsibilities.

In some embodiments, the outputs of the primary and secondary VCUs are cross-checked. Alternatively, the four sets of commands are cross-checked to determine whether one of the four main components are malfunctioning. In other embodiments, the integrity of the communication paths and braking controllers are monitored by the VCUs to ensure at least one valid path for the braking commands exists.

In some embodiments, the braking system architecture embodiments are able to transition from a faulty controller or a broken communication path to an alternative correctly functioning option within 20 ms, which is the process time of the brake controllers. In an example, this may be achieved by operating the fail-safe mechanisms in conjunction with the monitoring and diagnostic functions that detect failures when transitioning between braking controllers and communication paths.

In some embodiments, when the monitoring and diagnostic functionality detects that there may be a problem in the transitioning, mitigation strategies can be implemented. For an example, the vehicle may safely and slowly pull over to the side of the road or to a safe off-road or off-highway area. For another example, the vehicle may perform a safe in-lane stop.

Figure 3:
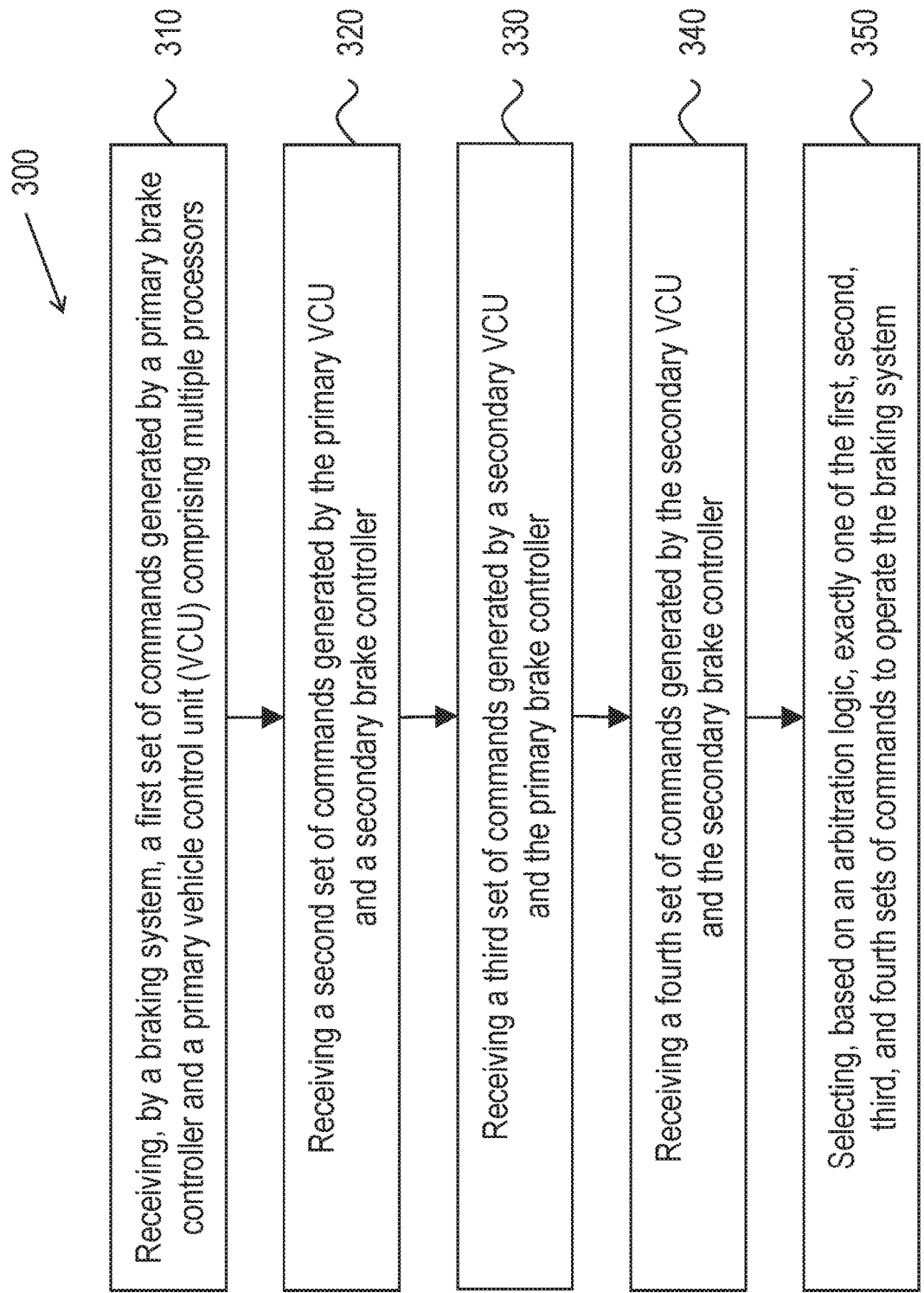
FIG. 3 shows a flowchart of an example method for controlling vehicle braking.

FIG. 3 shows a flowchart for an example method for controlling vehicle braking. The method 300 includes, at operation 310, receiving, by a braking system, a first set of commands generated by a primary brake controller and a primary vehicle control unit (VCU) comprising multiple processors.

The method 300 includes, at operation 310, receiving a second set of commands generated by the primary VCU and a secondary brake controller.

The method 300 includes, at operation 310, receiving a third set of commands generated by a secondary VCU and the primary brake controller.

The method 300 includes, at operation 310, receiving a fourth set of commands generated by the secondary VCU and the secondary brake controller.

The method 300 includes, at operation 310, selecting, based on an arbitration logic, exactly one of the first, second, third, and fourth sets of commands to operate the braking system.

In some embodiments, the arbitration logic selects the exactly one of the first, second, third, and fourth sets of commands based on an indication of a failure in the primary VCU, the secondary VCU, the primary brake controller, or the secondary brake controller.

In some embodiments, the method 300 further includes the operation of detecting the failure in the primary VCU, and configuring, based on the detecting and the master/slave architecture, the arbitration logic to select either the third set of commands or the fourth set of commands.

In some embodiments, the vehicle comprises a tractor-trailer configuration, and the braking system comprises an anti-lock braking system (ABS) for the trailer that is controlled by the secondary brake controller.

In some embodiments, the vehicle is an autonomous vehicle is operating in a level 4 (L4) automation mode.

In some embodiments, the at least one sensor comprises a plurality of passive wheel speed sensors coupled to the primary brake controller.

In some embodiments, the at least one sensor further comprises a plurality of active wheel speed sensors.

In some embodiments, the at least one sensor comprises a steering angle sensor, a yaw rate sensor, and a plurality of passive wheel speed sensors coupled to the secondary brake controller.

In some embodiments, the at least one sensor comprises a radar unit or a camera module coupled to the secondary brake controller.

In some embodiments, the method 300 further includes the operation of cross-checking, prior to the selecting, the first, second, third, and fourth sets of commands to detect a failure in one or more of the primary VCU, the secondary VCU, the primary brake controller, and the secondary brake controller.

In some embodiments, the arbitration logic is configured to select either the third set of commands or the fourth set of commands upon detecting the failure in the primary VCU, or select either the first set of commands or the second set of commands upon detecting the failure in the secondary VCU, or select either the second set of commands or the fourth set of commands upon detecting the failure in the primary brake controller, or select either the first set of commands or the third set of commands upon detecting the failure in the secondary brake controller.

Embodiments of the disclosed technology are directed to systems for controlling vehicle braking. An example system includes a braking system comprising a first input port configured to receive a first set of commands generated by a primary brake controller and a primary vehicle control unit (VCU) comprising multiple processors, a second input port configured to receive a second set of commands generated by the primary VCU and a secondary brake controller, a third input port configured to receive a third set of commands generated by the primary brake controller and a secondary VCU comprising multiple processors, and a fourth input port configured to receive a fourth set of commands generated by the secondary VCU and the secondary brake controller, and a processor configured to select, based on an arbitration logic, an operational set of commands as one of the first set of commands, the second set of commands, the third set of commands, and the fourth set of commands, and operate the braking system based on the operational set of commands.

In some embodiments, the primary VCU and the secondary VCU are coupled using a first communication protocol, and the primary brake controller and the secondary brake controller are coupled using a second communication protocol.

In some embodiments, the first communication protocol comprises a VCU internal controller area network (e.g., brake pressure control CAN), and the second communication protocol comprises a standard J1939 CAN.

In some embodiments, the processor is further configured to monitor, prior to selecting the operational set of commands, an integrity of the first communication protocol and the second communication protocol.

In some embodiments, the system further includes a first power supply coupled to the primary VCU and the secondary brake controller, and a second power supply coupled to the secondary VCU and the primary brake controller.

In some embodiments, the system further includes a first ignition signal source coupled to the primary VCU, and a second ignition signal source coupled to the secondary VCU.

In some embodiments, the system further includes a parking brake controller coupled to the primary and secondary VCUs, and the primary and secondary power supplies.

Figure 4:
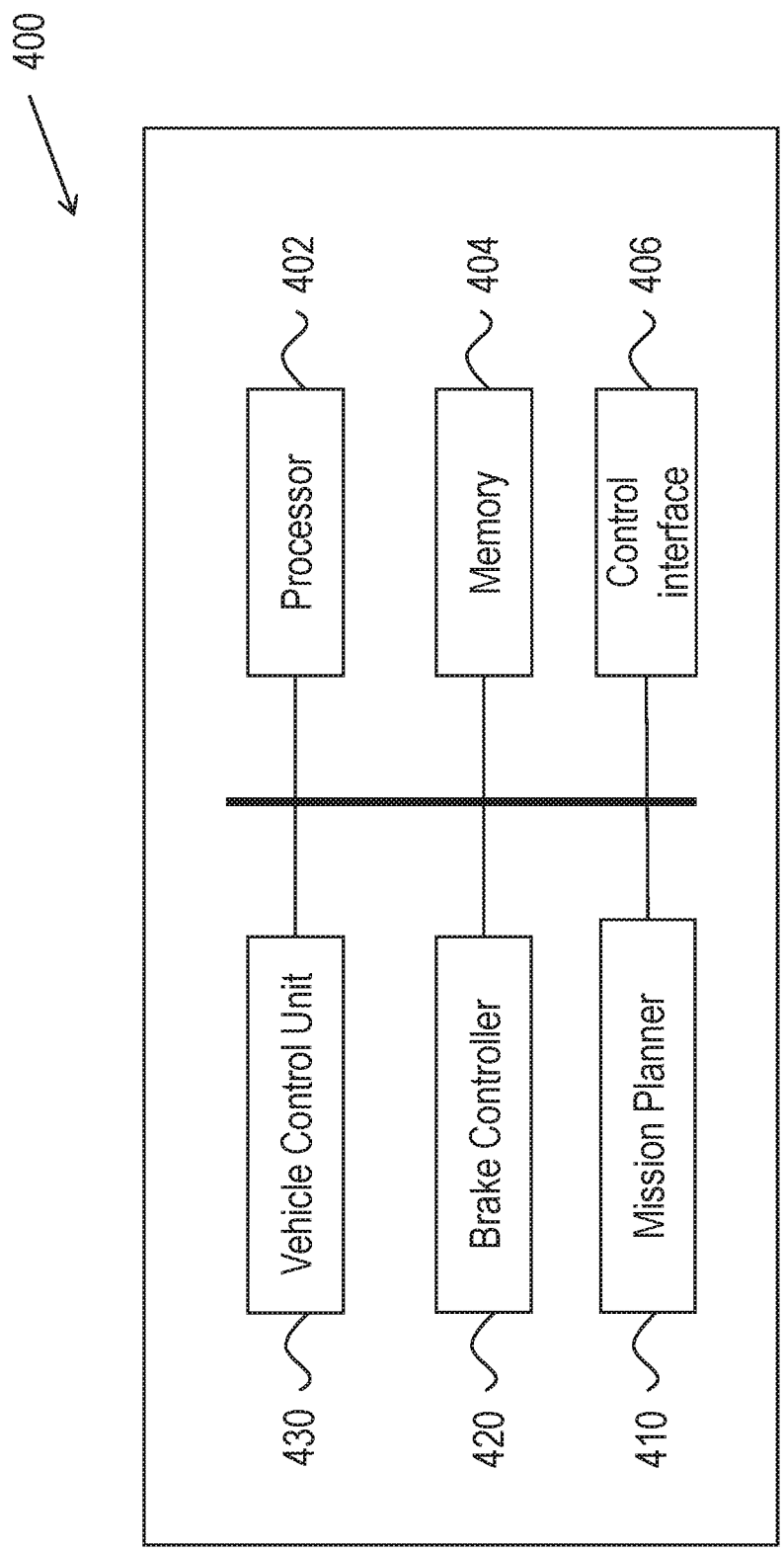
FIG. 4 shows an example of a hardware platform that can implement some methods and techniques described in the present document.

FIG. 4 shows an example of a hardware platform 400 that can be used to implement some of the techniques described in the present document. For example, the hardware platform 400 may implement method 300 or may implement the various modules described herein. The hardware platform 400 may include a processor 402 that can execute code to implement a method. The hardware platform 400 may include a memory 404 that may be used to store processor-executable code and/or store data. The hardware platform 400 may further include a control interface 406. For example, the control interface 406 may implement one or more intra-vehicular communication protocols. The hardware platform may further include a mission planner 410, a brake controller 420 and a vehicle control unit (VCU) 430. In some embodiments, some portion or all of the mission planner 410, the brake controller 420 and/or the VCU 430 may be implemented in the processor 402. In other embodiments, the memory 404 may comprise multiple memories, some of which are exclusively used by the mission planner, brake controller and/or the VCU.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A system for controlling vehicle braking, comprising:
    a braking system included in a vehicle and configured to operate brakes and further configured to:
        receive a first set of commands generated by a primary brake controller and a primary vehicle control unit (VCU) comprising multiple processors,
        receive a second set of commands generated by the primary VCU and a secondary brake controller,
        receive a third set of commands generated by the primary brake controller and a secondary VCU comprising multiple processors, and
        receive a fourth set of commands generated by the secondary VCU and the secondary brake controller; and
    a processor configured to:
        select, based on an arbitration logic, an operational set of commands as one of the first set of commands, the second set of commands, the third set of commands, and the fourth set of commands; and
        operate the braking system based on the operational set of commands.

2. The system of claim 1, wherein the primary VCU and the secondary VCU are coupled using a first communication protocol, and wherein the primary brake controller and the secondary brake controller are coupled using a second communication protocol.

3. The system of claim 2, wherein the first communication protocol comprises a VCU internal controller area network (CAN), and wherein the second communication protocol comprises a J1939 CAN.

4. The system of claim 3, wherein the VCU internal CAN is a brake pressure control CAN.

5. The system of claim 2, wherein the processor is further configured to:
    monitor, prior to selecting the operational set of commands, an integrity of the first communication protocol and the second communication protocol.

6. The system of claim 1, further comprising:
    a first power supply coupled to the primary VCU and the secondary brake controller; and
    a second power supply coupled to the secondary VCU and the primary brake controller.

7. The system of claim 6, further comprising:
    a first ignition signal source coupled to the primary VCU; and
    a second ignition signal source coupled to the secondary VCU.

8. The system of claim 6, further comprising:
    a parking brake controller coupled to the primary VCU, the secondary VCU, the primary power supply, and the secondary power supply.

9. A method of controlling vehicle braking in a vehicle, comprising:
    receiving, by a braking system, a first set of commands generated by a primary brake controller and a primary vehicle control unit (VCU) comprising multiple processors;
    receiving a second set of commands generated by the primary VCU and a secondary brake controller;
    receiving a third set of commands generated by a secondary VCU and the primary brake controller;
    receiving a fourth set of commands generated by the secondary VCU and the secondary brake controller; and
    selecting, based on an arbitration logic, exactly one of the first, second, third, and fourth sets of commands to operate the braking system,
    wherein the primary VCU and the secondary VCU are configured in a master/slave architecture.

10. The method of claim 9, wherein the arbitration logic selects the exactly one of the first, second, third, and fourth sets of commands based on an indication of a failure in the primary VCU, the secondary VCU, the primary brake controller, or the secondary brake controller.

11. The method of claim 10, further comprising:
    detecting the failure in the primary VCU; and
    configuring, based on the detecting and the master/slave architecture, the arbitration logic to select either the third set of commands or the fourth set of commands.

12. The method of claim 9, wherein the vehicle comprises a tractor-trailer configuration, and wherein the braking system comprises an anti-lock braking system (ABS) for a trailer that is controlled by the secondary brake controller.

13. The method of claim 9, wherein the vehicle is an autonomous vehicle is operating in a level 4 (L4) automation mode.

14. A non-transitory computer-readable storage medium having instructions stored thereupon for controlling vehicle braking, comprising:
    instructions for receiving, by a braking system, a first set of commands generated by a primary brake controller and a primary vehicle control unit (VCU) comprising multiple processors;
    instructions for receiving a second set of commands generated by the primary VCU and a secondary brake controller;

instructions for receiving a third set of commands generated by a secondary VCU and the primary brake controller;

instructions for receiving a fourth set of commands generated by the secondary VCU and the secondary brake controller; and instructions for selecting, based on an arbitration logic, exactly one of the first, second, third, and fourth sets of commands to operate the braking system, wherein at least one of the first, second, third, and fourth sets of commands is generated further based on an output of at least one sensor coupled to the primary brake controller or the secondary brake controller.

15. The non-transitory computer-readable storage medium of claim 14, wherein the at least one sensor comprises a plurality of passive wheel speed sensors coupled to the primary brake controller.

16. The non-transitory computer-readable storage medium of claim 15, wherein the at least one sensor further comprises a plurality of active wheel speed sensors.

17. The non-transitory computer-readable storage medium of claim 14, wherein the at least one sensor comprises a steering angle sensor, a yaw rate sensor, and a plurality of passive wheel speed sensors coupled to the secondary brake controller.

18. The non-transitory computer-readable storage medium of claim 14, wherein the at least one sensor comprises a radar unit or a camera module coupled to the secondary brake controller.

19. The non-transitory computer-readable storage medium of claim 14, further comprising:

instructions for cross-checking, prior to the selecting, the first, second, third, and fourth sets of commands to detect a failure in one or more of the primary VCU, the secondary VCU, the primary brake controller, and the secondary brake controller.

20. The non-transitory computer-readable storage medium of claim 19, wherein the arbitration logic is configured to:

select either the third set of commands or the fourth set of commands upon detecting the failure in the primary VCU, or select either the first set of commands or the second set of commands upon detecting the failure in the secondary VCU, or select either the second set of commands or the fourth set of commands upon detecting the failure in the primary brake controller, or select either the first set of commands or the third set of commands upon detecting the failure in the secondary brake controller.

\* \* \* \* \*